United States Patent
Sauvant-Moynot et al.

(10) Patent No.: US 7,220,342 B2
(45) Date of Patent: May 22, 2007

(54) SELF-REPAIRING STRUCTURE AND COATING FOR CORROSIVE MEDIUM

(75) Inventors: Valérie Sauvant-Moynot, Lyons (FR); Sébastien Duval, Evron (FR); Serge Gonzalez, Decines (FR); Jacques Vallet, Lyons (FR); Jacky Grenier, Vignieu (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 204 days.

(21) Appl. No.: 11/116,375

(22) Filed: Apr. 28, 2005

(65) Prior Publication Data
US 2005/0241934 A1    Nov. 3, 2005

(30) Foreign Application Priority Data
Apr. 28, 2004  (FR) ................................. 04 04605

(51) Int. Cl.
*C23F 13/14*    (2006.01)
(52) U.S. Cl. .................. 204/196.37; 204/196.36; 204/196.1; 204/196.01
(58) Field of Classification Search ........ 205/724–740; 204/196.01, 196.1, 196.36, 196.37
See application file for complete search history.

(56) References Cited

U.S. PATENT DOCUMENTS

| 2,200,469 | A | 5/1940 | Cox |
| 7,108,914 | B2* | 9/2006 | Skipor et al. .......... 428/402.21 |
| 2004/0007784 | A1 | 1/2004 | Skipor et al. |
| 2006/0275376 | A1* | 12/2006 | Guimberteau et al. ...... 424/490 |

FOREIGN PATENT DOCUMENTS

| WO | WO 99/61182 A | 12/1999 |
| WO | WO 2004/016826 A | 2/2004 |

* cited by examiner

*Primary Examiner*—Bruce F. Bell
(74) *Attorney, Agent, or Firm*—Millen, White, Zelano & Branigan, P.C.

(57) ABSTRACT

The invention concerns a structure comprising at least one metallic surface which undergoes cathodic protection and a protective coating for said surface, said coating comprising a polymer including micro-capsules containing compounds sensitive to the electric field generated by the cathodic protection and capable of reacting in an alkaline medium to form a protective layer on the surface of the structure when it is in direct contact with a corrosive medium.

The invention also concerns the coating associated with said structure.

21 Claims, 1 Drawing Sheet

SELF-REPAIRING STRUCTURE AND COATING FOR CORROSIVE MEDIUM

The present invention relates to the field of structures comprising a metallic surface protected from corrosion by cathodic protection.

BACKGROUND OF THE INVENTION

Self-repairing materials taking their inspiration from living systems are known in which minor damage causes an automatic self-repair response, fracturing, cutting, etc. . . ).

An intelligent system based on similar principles would be very interesting for structures including an organic coating, whereby cracking or delamination of said coating could be at least partially repaired or wherein effects could be reduced without manual intervention. Such a coating with a self-repairing capacity could be considered to endow the protected structure with a substantially increased service life.

Two major self-repairing material concepts exist. The first consists of closing the crack, the second in filling it.

In the case of closing the crack, the two faces are drawn together to remove the stress concentration at the bottom of the crack: without such stress concentration, the crack cannot propagate. The two faces can be brought together by shape memory materials (metallic alloy or polymer).

When filling a crack, the crack is filled with a repair agent. The latter is a cross-linkable polymer, generally of the same nature as the coating, which will form a chemical bond between the two faces of the crack. It may also be a solvent, preferably for thermoplastics, which will cause the polymer chains either side of the crack to diffuse (in this case there is no cross linking/bonding between the two faces).

In the context of self-repairing materials using a repair agent, three points are crucial to implementation:
storing the repair agent;
transporting said agent to the crack; and
initiating the repair action.

In the literature, repair agents are stored in hollow spheres or micro-capsules within the polymer and can repair the polymer in the event of a crack.

As an example, U.S. Pat. No. 6,518,330 describes a polymer comprising inclusions of micro-capsules or hollow spheres filled with a polymerizable agent and particles of a catalyst for the polymerization reaction.

In a further example which is similar to the preceding example, United States patent application US-A-2004/0007784 describes a polymer in which the catalyst particles are bonded to the surface of micro-capsules containing the polymerizable agent.

For such storage systems, the repair reaction is caused by the stress field in the crack. This causes the hollow spheres to break. The repair agent is then transported along the crack by capillary forces and polymerizes under the effect of the catalyst, thus plugging the crack.

Finally, in the case of such self-repairing materials it is necessary to have a repair agent in situ which is close to any possible cracks and ready to react during alteration of the material.

In the more particular case of structures comprising at least one metallic surface protected from external corrosion by cathodic protection, in accordance with the invention it is more particularly proposed to develop an assembly comprising an anti-corrosion coating for said surfaces in a corrosive medium (water, land) which is also protective and self-repairing. A typical use for said assembly, for example, concerns the protection of pipelines placed in seawater or buried, for the transport of effluents.

Effluent conduits and steel installations may be protected by the joint action of a coating and cathodic protection. The latter consists of placing the metallic surface under a sufficiently low electrical potential, ideally less than −0.8 V, and preferably in the range −0.8 V to −1.1 V/(Ag/AgCl), to minimize corrosion.

As an example, in the particular case of steel oil pipelines which are submerged in the sea, they are often protected from corrosion by the presence of a coating and by using cathodic protection. The latter consists of applying a potential that artificially places the metallic surface of the pipeline outside its corrosion potential, thus rendering it less corrodible than it was initially.

Cathodic protection may be achieved in two different manners:
  either by bringing the structure into contact with a second metal at a potential which is lower than that of the metal comprising the structure, which is then generally designated by the term "sacrificial anode";
  or by applying an impressed current which renders corrosion of the metal comprising the structure impossible.

According to the principle of cathodic protection, when cathodic protection is applied, the oxidation reaction (equation [1]) of the metal composing the wall (termed a metal in the present description) is discouraged and oxygen reduction (equation [2]) and/or proton reduction (equation [3]) is encouraged, or even water reduction at a very low potential (equation [4]). In practice, it is very difficult to control the applied potential, which sometimes leads to cathodic overprotection when the potential is too negative.

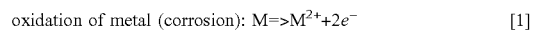
oxidation of metal (corrosion): $M \Rightarrow M^{2+} + 2e^-$ [1]

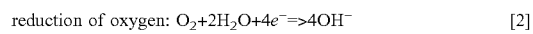
reduction of oxygen: $O_2 + 2H_2O + 4e^- \Rightarrow 4OH^-$ [2]

proton reduction: $2H^+ + e^- \Rightarrow H_2$ [3]

water reduction: $2H_2O + 2e^- \Rightarrow 2OH^- + H_2$ [4]

If the coating has a defect such as micro-cracking caused, for example, during application of the coating, laying the structure, contact with the seabed or the land or by ageing of the coating, OH ions will become concentrated at the coating/metallic surface interface at the defect. The significant increase in pH in said zone has the effect of causing greater or lesser loss of adhesion of the coating, risking its detachment sooner or later.

On the one hand, the production of hydrogen associated with proton reduction (equation [3]) or, in the case of cathodic overprotection, the reduction of water (equation [4]) has the result of reducing the metal oxides present on the structure surface, this phenomenon causing a loss of adhesion of the coating on the metal and detachment thereof. In extreme cases, a high concentration of hydrogen may also cause breakage of the metallic structure.

SUMMARY OF THE INVENTION

One aim of the invention is to form a repairing film which protects the region of the structure where the metal is in direct contact with the corrosive medium, i.e. at the micro-crack, to (i) limit the formation of hydrogen and thus the risk of detachment of the coating, or even of breakage of the structure, and (ii) of reducing the impressed current requirement or the size and/or rate of consumption of the sacrificial anode.

In accordance with the invention, the gradient of the alkaline medium caused by the cathodic protection in the region in which the metal is in contact with the corrosive medium is exploited, to result in the autonomous formation of a repair deposit, i.e. with no external intervention, in particular in the case in which the crack propagates through the coating to the metal constituting the structure.

In accordance with the invention, the electric field generated by the cathodic protection is advantageously employed to allow migration, to the region of the crack, of the products intended to form the repair film on the metallic surface of the structure.

More precisely, the invention concerns a structure comprising at least one metallic surface which undergoes cathodic protection and a protective coating for said surface, said coating comprising a polymer including micro-capsules containing compounds which are sensitive to the electric field generated by the cathodic protection and which are capable of reacting in an alkaline medium to form a protective layer on the surface of the structure when it is in direct contact with a corrosive medium.

In general, the polymer is selected from the group constituted by polyolefins, saturated and unsaturated polyesters, alkyd resins, acrylic resins, phenolic resins, epoxy resins and polyurethanes.

As an example, the structure is selected from the group constituted by buried or submerged pipelines, reservoirs, boats and port or marine facilities.

Usually, the metal is selected from the group constituted by steels, irons and metallic alloys of iron, chromium and metallic alloys of chromium, stainless steels, and copper and nickel bases.

In accordance with one possible implementation, cathodic protection of the structure is provided by a metal with a potential that is lower than that of the metal of the protected metallic surface.

In accordance with a further possible implementation, a current is impressed on the metallic surface to implement cathodic protection.

The invention also concerns the coating as described above.

In accordance with a first application, the compounds included in the micro-capsules may be salts of alkalis and/or alkaline-earths and/or of metals which are soluble in seawater.

As an example, said compounds may be zinc salts mixed with phosphonates and/or polyphosphates.

In accordance with a further application, said compounds may be polymerization agents which can be coagulated on the wall of a surface subjected to a cathodic potential in an alkaline medium and which can be cross linked at the temperature of said wall.

BRIEF DESCRIPTION OF THE DRAWINGS

The invention will be better understood from FIG. 1 which illustrates a possible implementation, which is provided solely for the purposes of illustration of the invention and its advantages, but which should be considered to be non limiting regardless of the aspect under consideration.

DETAILED DESCRIPTION OF THE INVENTION

Figure 1:
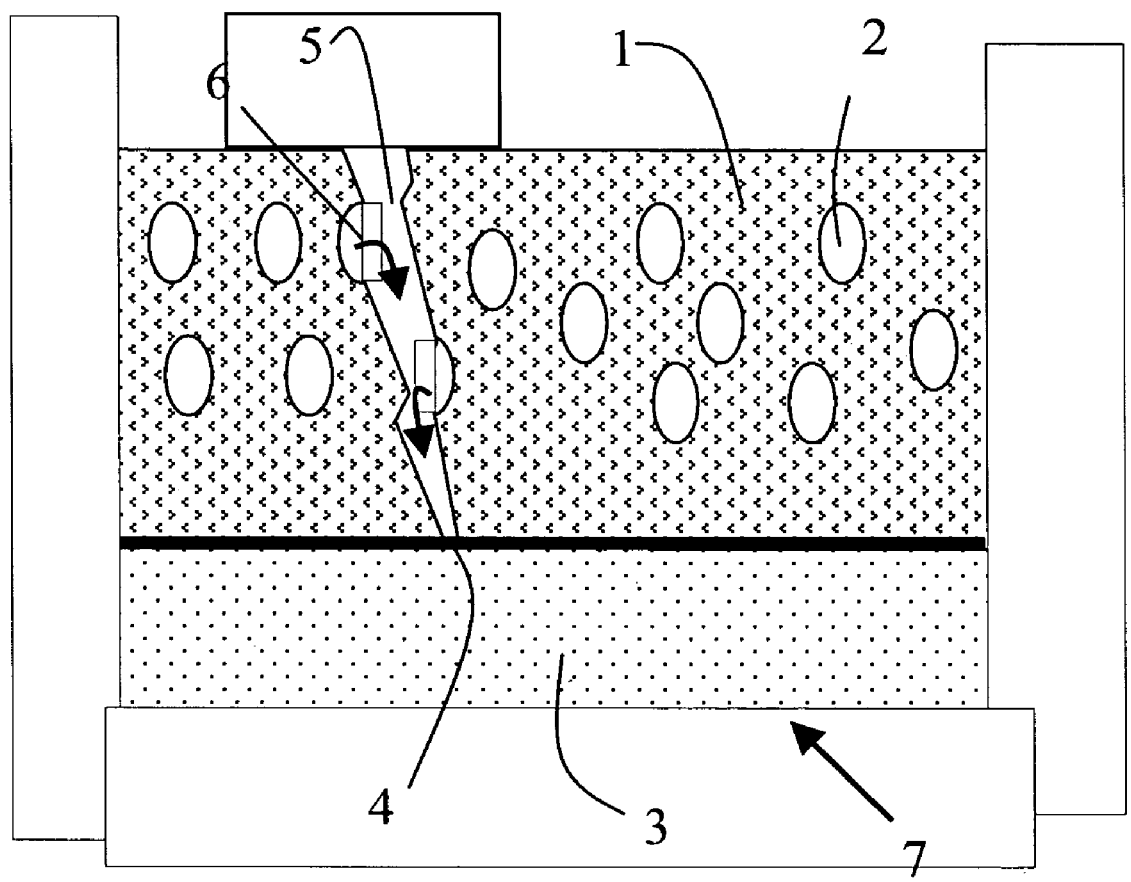

In FIG. 1, a pipeline 7 in accordance with the invention is immersed in seawater and is shown in cross section. It comprises a conduit 3 produced from a metal such as steel which is cathodically protected either by an impressed current, or under the effect of a sacrificial anode constituted, for example, by metallic zinc (not shown in FIG. 1). The sacrificial anode is generally constituted by bars or rings which are regularly distributed on the structure. A coating 1 of the invention also protects the conduit 3 from seawater by completely covering it.

The coating 1 is constituted by a polymer which contains micro-capsules 2 filled with one or more compounds which are sensitive to an alkaline pH, for example as defined in the remainder of the description. In accordance with the invention, when a micro-crack 5 is produced and propagates to the surface of the conduit 3, the micro-capsules 2 break and the compounds trapped therein are released. Under the effect of the electric field generated by the cathodic protection, these will migrate towards the contact point 4 between the seawater and the conduit. During the next step, said compounds react in an alkaline medium to form the protective deposit on the conduit 3, for example as described in the remainder of the description with respect to modes I and II.

Although the invention is not limited thereby, the two implementations below serve to illustrate two possible choices for said compounds:

Mode I: The compounds used are mineral salts.

As an example, a conduit as described above is surrounded by a protective polymer, cathodic protection being ensured by an impressed current. Alkali salts, alkaline-earth salts or hydrosoluble metallic salts such as magnesium and/or calcium salts are encapsulated in the polymer then released during rupture of the micro-capsule under the effect of a stress imposed on the conduit to generate micro-cracks in the coating. It is then seen that a protective deposit of $CaCO_3$ and/or $Mg(OH)_2$ forms a sealed protective film which can then limit the current demand for the cathodic protection.

A film may also be obtained by releasing soluble metal salts such as zinc salts and by precipitating zinc hydroxide on the surface of the conduit the compactness of which can also advantageously be adjusted in the presence of phosphonates and/or polyphosphates.

Mode II: The compounds used are polymerization agents.

This implementation is particularly suitable for pipelines which are heated to a high temperature, i.e. typically over 50° C., such as those used to transport hot fluids, or at a compressor outlet.

The polymerization agents are generally monomers. They are confined in the protective polymer of the conduit by encapsulation then, after release, will be deposited on the surface of the pipeline in contact with seawater under the influence of the alkaline pH and the generated electrical field. Such a process can in particular be based on routine cathodic electro-deposition or cataphoresis, an example of which is given in the "Manuel de technologie des peintures et vernis" [Paint and Varnish Technology Handbook], Eurocol: in a first step, the polymerization precursors are rendered hydrosoluble and coagulatable; as an example, an epoxy monomer is functionalized by reaction with a secondary amine to produce a tertiary amine, then when transferred to an acidic medium, to produce a soluble functionalized ammonium ion. Since it is positively charged, the functionalized ammonium ion is attracted by a surface subjected to a cathodic potential (negative pole) and migrates under the effect of the electric field. Further, the ammonium ion coagulates on the wall of the surface subjected to a cathodic potential by neutralization with OH⁻ ions formed at the cathode which induces the deposition reaction. Subsequently, the hot pipeline, i.e. at the temperature of the fluid passing through it, can cross link the coagulated functionalized precursors, thus causing healing of the micro-crack.

The micro-capsules used in the present invention may be of any known type, shape or dimension and may be synthesized using any known technique, for example using the techniques described in U.S. Pat. No. 6,518,330 or in United States patent application US-A-2004/0007784.

The structures of the invention may, for example, be buried or submerged pipelines, reservoirs, boats or port or marine facilities.

The constituent metals of the structure of the invention may contain or may be constituted by steel, iron and other metallic alloys such as alloys of iron or chromium, or stainless steel, or nickel or copper bases, etc.

Cathodic protection is ensured in accordance with the invention by applying an impressed current or by a sacrificial anode comprising or constituted by metals usually included in the group constituted by zinc, magnesium or aluminium.

According to the invention, the compounds contained in the micro-capsules are selected as a function of their sensitivity to the electric field generated by the cathodic protection (a surface subjected to a cathodic potential is a negative pole), i.e. they will migrate towards the surface of the metallic structure in contact with the corrosive medium under the effect of said electric field and as a function of their reactivity in an alkaline medium to form a protective layer on the structure in contact with the corrosive medium.

The invention claimed is:

1. A structure comprising at least one metallic surface provided with cathodic protection and a protective coating for said surface, said coating comprising a polymer including micro-capsules containing compounds which are responsive to the electric field generated by the cathodic protection and which are capable of reacting in an alkaline medium to form a protective layer on the surface of the structure.

2. A structure according to claim 1, wherein the polymer is selected from the group consisting of polyolefins, saturated and unsaturated polyesters, alkyd resins, acrylic resins, phenolic resins, epoxy resins and polyurethanes.

3. A structure according to claim 2, wherein said compounds comprise cross-linkable polymerization agents which can coagulate on a surface subjected to a cathodic potential in alkaline medium.

4. A structure according to claim 2 wherein said compounds comprise sea-water soluble salts.

5. A structure according to claim 1 wherein said structure composes any of buried or immersed pipelines, reservoirs, boats and port or marine facilities.

6. A structure according to claim 1 wherein the metallic surface is selected from the group consisting of steels, irons and metallic alloys of iron, chromium and metallic alloys of chromium, stainless steels, copper and nickel bases.

7. A structure according to claim 1, comprising a metal as a sacrificial anode with a potential that is lower than the metallic surface, to carry out said cathodic protection.

8. A structure according to claim 7, wherein said compounds comprise cross-linkable polymerization agents which can coagulate on a surface subjected to a cathodic potential in an alkaline medium.

9. A structure according to claim 7 wherein said compounds comprise sea-water soluble salts.

10. A structure according to claim 7, wherein said compounds comprise salts of zinc mixed with phosphonates and/or polyphosphates, or salts of alkalimetals or alkaline-earth metals.

11. A structure according to claim 1 provided with a current on the metallic surface for said cathodic protection.

12. A structure according to claim 11, wherein said compounds comprise cross-linkable polymerization agents which can coagulate on a surface subjected to a cathodic potential in an alkaline medium.

13. A structure according to claim 11, wherein said compounds comprise sea-water soluble salts.

14. A structure according to claim 11, wherein said compounds comprise salts of zinc mixed with phosphonates and/or polyphosphates, or salts of alkalimetals or alkaline-earth metals.

15. A structure according to claim 1, wherein said compounds comprise cross-linkable polymerization agents which can coagulate on a surface subjected to a cathodic potential in an alkaline medium.

16. A structure according to claim 1 wherein said compounds comprise sea-water soluble salts.

17. A structure according to claim 1, wherein said compounds comprise salts of zinc mixed with phosphonates and/or polyphosphates, or salts of alkalimetals or alkaline-earth metals.

18. A coating on the surface of a structure, said coating comprising a polymer including micro-capsules containing compounds which are responsive to the electric field generated by the cathodic protection and which are capable of reacting in an alkaline medium to form a protective layer on said surface of said structure.

19. A coating according to claim 18, wherein said compounds comprise cross-linkable polymerization agents which can coagulate on a surface subjected to a cathodic potential in an alkaline medium.

20. A coating according to claim 18, wherein said compounds comprise sea-water soluble salt.

21. A coating according to claim 20, wherein said compounds comprise salts of zinc mixed with phosphonates and/or polyphosphates, or salts of alkali metals or alkaline-earth metals.

* * * * *

UNITED STATES PATENT AND TRADEMARK OFFICE
CERTIFICATE OF CORRECTION

PATENT NO. : 7,220,342 B2 Page 1 of 1
APPLICATION NO. : 11/116375
DATED : May 22, 2007
INVENTOR(S) : Valerie Sauvant-Moynot It is certified that error appears in the above-identified patent and that said Letters Patent is hereby corrected as shown below:

Column 6, line 51 reads "salt", should read -- salts --

Signed and Sealed this

Twenty-seventh Day of November, 2007

JON W. DUDAS
*Director of the United States Patent and Trademark Office*